April 17, 1951    E. C. MILLER ET AL    2,548,994
MECHANISM FOR TRANSMITTING MOTION
Filed Oct. 9, 1948
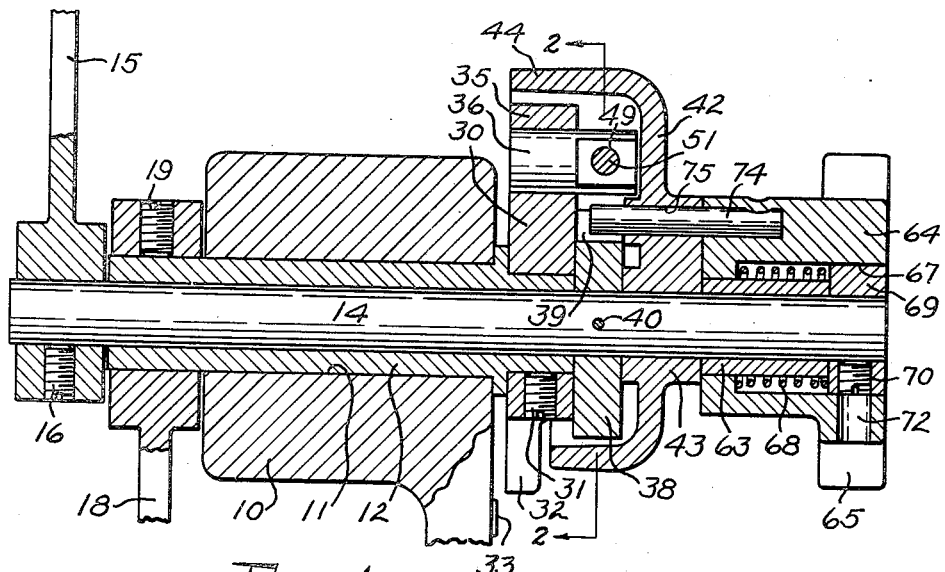
Fig. 1
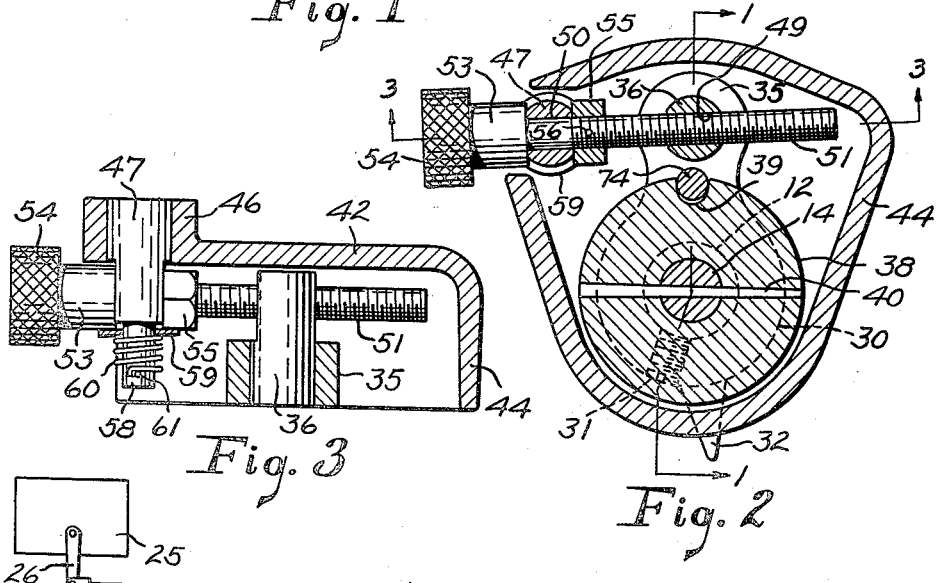
Fig. 3
Fig. 2
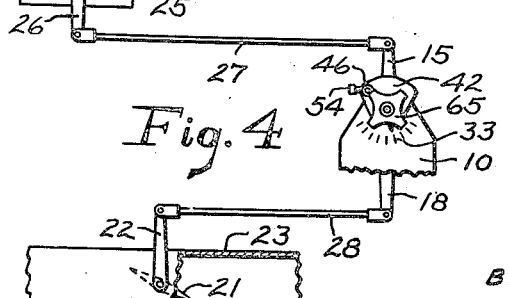
Fig. 4
INVENTORS
EARLE C. MILLER
ALAN C. NEILSON
BY Albert G. Blodgett
ATTORNEY Patented Apr. 17, 1951

2,548,994

UNITED STATES PATENT OFFICE 2,548,994

MECHANISM FOR TRANSMITTING MOTION

Earle C. Miller and Alan C. Neilson, Worcester, Mass., assignors to Riley Stoker Corporation, Worcester, Mass., a corporation of Massachusetts Application October 9, 1948, Serial No. 53,666

3 Claims. (Cl. 74—525)

This invention relates to mechanism for transmitting motion, and more particularly to apparatus adapted to form a mechanical connection between an automatic regulator and a device controlled by such regulator.

With apparatus of this general type as ordinarily constructed, movement of the automatic regulator through a predetermined range of travel will result in movement of the controlled device through a predetermined range of travel. While such an arrangement operates satisfactorily in some cases, there are many installations in which a more flexible connection would be preferable. In particular, some provision for adjusting the relative positions of the parts is desirable, as well as some means whereby the operator can assume manual control of the controlled device.

It is accordingly one object of the invention to provide a simple and dependable mechanism adapted to transmit motion from an automatic regulator to a controlled device and including a conveniently adjustable means for varying the position of the said device relative to that of the regulator.

It is a further object of the invention to provide a mechanism for connecting an automatic regulator to a controlled device and constructed to allow the operator to control the said device manually when desired.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a longitudinal sectional view of a motion transmitting mechanism, the section being taken on the line 1—1 of Fig. 2;

Fig. 2 is a section taken on the line 2—2 of Fig. 1;

Fig. 3 is a section taken on the line 3—3 of Fig. 2; and

Fig. 4 is a front elevation of the mechanism shown connected to other apparatus.

As best shown in Fig. 1, the embodiment illustrated comprises a stationary frame member 10 having a horizontal borell extending therethrough to provide a bearing. A sleeve 12 is rotatably supported in the bore 11, and a shaft 14 is rotatably supported in the sleeve. An arm 15 is fastened to the rear end of the shaft 14 by means of a set screw 16, and an arm 18 is fastened to the rear end of the sleeve 12 by means of a set screw 19.

Referring now to Fig. 4, there is shown a typical controlled device in the form of a damper 21 provided with an operating arm 22 and mounted in a conduit 23 to control the flow of fluid therethrough. Also shown is a suitable automatic regulator 25 having an arm 26 arranged to swing in one direction or the other in a well known manner in response to changes in some variable such as temperature, pressure, or the like. The regulator arm 26 is connected to the arm 15 by a link 27, and the arm 18 is connected to the damper arm 22 by a link 28. Since the shaft 14 receives power directly from the regulator 25, this shaft may be described as the power input element of our mechanism. Since the sleeve 12 delivers power directly to the damper 21, this sleeve may be described as the power output element of our mechanism.

The shaft 14 is connected to the sleeve 12 by mechanism which provides for manual adjustment of the relative angular positions of these parts. As illustrated, a disk 30 is fastened to the front end of the sleeve 12 by a set screw 31. This disk is provided with a downwardly projecting pointer 32 which cooperates with suitable markings 33 on the front face of the frame 10 to indicate the position of the disk and of the damper 21. The disk 30 is also provided with an upwardly extending ear 35 which is bored to receive the rear portion of a horizontal swivel pin 36, the latter being free to turn within the said ear. A circular disk 38 having a notch 39 in its periphery is fastened to the shaft 14, immediately in front of the disk 30, by means of a taper pin 40. A member in the form of a cover plate 42 having a central hub 43 is mounted on the shaft 14 immediately in front of the disk 38, this plate having a rearwardly extending flange 44 which partially encloses the disks 30 and 38. The shaft 14 extends through the hub 43, which is free to turn on the shaft. On the front face of the plate 42 there is provided a boss 46 (Fig. 3) which is bored to receive the front portion of a horizontal swivel pin 47, the latter being free to turn within the said boss.

The two swivel pins 36 and 47 are connected to one another by a linkage which may be adjusted manually to vary its effective length. For this purpose the pin 36 is provided with an internally threaded hole 49 extending transversely therethrough, and the pin 47 is provided with a plain cylindrical hole 50 extending transversely therethrough. A screw 51 extends through the holes 49 and 50, this screw having threads to engage the threads in the hole 49. The screw 51 is provided with an enlarged portion 53 forming a shoulder for engagement with the outer side of the pin 47, and at the outer end of the portion 53 the screw is enlarged to form a knurled handle 54 so that the screw can be rotated manually. A hexagonal nut 55 is mounted on the screw 51 close to the inner side of the pin 47, the nut being fastened to the screw by a small transverse pin 56 (Fig. 2). As best shown in Fig. 3, the rear portion 58 of the pin 47 is somewhat reduced in diameter to receive a washer 59 and a coiled compression spring 60 which are held in place by a small transverse pin 61. The spring 60 holds the washer 59 yieldably against one side of the hexagonal nut 55 to prevent undesired rotation of the nut and the screw 51 by reason of vibration.

Means is provided whereby the cover plate 42 may be either clutched to the shaft 14 and rotated thereby or released from this shaft and rotated manually. As shown in Fig. 1, a bushing 63 is mounted on the shaft 14 in front of the hub 43 of the cover plate, and this bushing is surrounded by the hub 64 of a handle or control knob 65. The hub 64 is provided with a counterbore 67 to receive a coiled compression spring 68 which surrounds the bushing 63. Within the front portion of the counterbore there is located a collar 69 which is fastened to the shaft 14 in front of the bushing 63 by means of a set screw 70. A radial opening 72 in the hub 64 permits access to the set screw 70 for assembly purposes. A pin 74 is slidable in an opening 75 through the hub 43 of the cover plate 42, parallel with the shaft 14. The rear portion of this pin engages the notch 39 in the disk 38, and the front portion of the pin is suitably fixed to the hub 64 of the handle 65. Hence, when the handle is pulled forwardly against the pressure of the spring 68, the pin 74 will be withdrawn from the notch 39, and the plate 42 will be free to turn on the shaft 14. The pin 74 and the notched disk 38 form a releasable clutch.

The operation of the invention will now be apparent from the above disclosure. With the mechanism connected as shown in Fig. 4, movements of the arm 26 of the automatic regulator 25 will be transmitted through the link 27 and the arm 15 to the shaft 14 to turn the shaft and the disk 38 attached thereto. So long as the pin 74 engages the notch 39 in the disk, the cover plate 42 will move with the disk. Since the cover plate carries the swivel pin 47, the motion will be transmitted through this pin, the screw 51, the swivel pin 36, and the disk 30 to the sleeve 12. As the sleeve turns it will swing the arm 18 and transmit motion through the link 28 and the arm 22 to the damper 21. Thus the damper will be controlled automatically by the regulator 25. At times it may be desirable to adjust the position of the damper with respect to the automatic regulator while maintaining the operative connection between these parts. This can be done by turning the screw 51 by means of the knurled handle 54. This will alter the distance between the swivel pins 47 and 36, and the pin 36 will bring about the desired movement of the disk 39 and the sleeve 12. If the operator wishes to disconnect the damper from the automatic regulator and control the damper manually, he need merely pull the handle 65 forwardly far enough to withdraw the pin 74 from the notch 39, whereupon he may move the damper by turning the said handle, which will remain connected to the hub 43 by the pin 74. It will be noted that upon release of the handle, with the pin 74 out of registration with the notch 39, the spring 68 will urge the handle rearwardly until the rear end of the pin engages the front face of the disk 38, the pin being free to slide thereon as the handle is turned. Whether the damper 21 is under automatic control or manual control, the pointer 32 in conjunction with the markings 33 will always indicate the position of the sleeve 12 and of the damper.

The mechanism is comparatively simple and compact, and fully effective for its intended purpose.

Having thus described our invention, what we claim as new and desire to secure by Letters Patent is:

1. A motion transmitting mechanism for connecting an automatic regulator to a controlled device comprising a frame providing a bearing, a sleeve rotatably mounted in the bearing and forming a power output element, a shaft rotatably mounted in the sleeve and forming a power input element, a member rotatably mounted on the shaft, a manually releasable clutch connecting the member to the shaft, a member fixed to the sleeve, and means connecting the two members to one another for rotation in unison and including a screw adjustable manually in effective length to vary their relative angular positions.

2. A motion transmitting mechanism for connecting an automatic regulator to a controlled device comprising a frame providing a bearing, a sleeve rotatably mounted in the bearing and forming a power output element, a shaft rotatably mounted in the sleeve and forming a power input element, a member fixed to the sleeve adjacent one end thereof, a clutch element fixed to the shaft adjacent to said member, a plate rotatably mounted on the shaft adjacent to the clutch element, a linkage connecting the member and the plate for rotation in unison and adjustable manually in effective length to vary their relative angular positions, a handle slidably and rotatably mounted on the shaft adjacent the plate, a spring yieldably urging the handle toward the plate, and a pin extending from the handle slidably through the plate and into engagement with the clutch element to provide a manually releasable connection between the clutch element and the plate.

3. A motion transmitting mechanism for connecting an automatic regulator to a controlled device comprising a frame providing a bearing, a sleeve rotatably mounted in the bearing and forming a power output element, a shaft rotatably mounted in the sleeve and forming a power input element, a member rotatably mounted on the shaft, a manually releasable clutch connecting the member to the shaft, a member fixed to the sleeve, a pointer on the last mentioned member, markings on the frame cooperating with the pointer to indicate the position of the sleeve, and means connecting the two members to one another for rotation in unison and including a manually adjustable device to vary their relative angular positions.

EARLE C. MILLER.
ALAN C. NEILSON.

REFERENCES CITED

The following references are of record in the file of this patent:

UNITED STATES PATENTS

| Number | Name | Date |
|---|---|---|
| 1,275,026 | Herzog | Aug. 6, 1918 |
| 1,694,601 | Martin | Dec. 11, 1928 |
| 1,720,422 | Manville | July 9, 1929 |
| 1,780,960 | Williams | Nov. 11, 1930 |
| 1,987,066 | Kingston | Jan. 8, 1935 |
| 1,989,771 | Reppert | Feb. 5, 1935 |
| 2,031,841 | Marsden | Feb. 25, 1936 |
| 2,244,990 | Gildea | June 10, 1941 |

FOREIGN PATENTS

| Number | Country | Date |
|---|---|---|
| 15,095 | Great Britain | July 8, 1903 |
| 285,992 | Great Britain | Feb. 27, 1928 |
| 458,676 | Germany | Apr. 17, 1928 |